United States Patent
Guerin et al.

(10) Patent No.: US 6,200,368 B1
(45) Date of Patent: Mar. 13, 2001

(54) COMBINED FILTER DEVICE FOR FILTERING OUT PARTICLES AND GASES

(75) Inventors: Richard Guerin, Rongeugerai; Claude Legrand, Conde sur Noireau; Gérard Jacq, Athis de l'Orne, all of (FR)

(73) Assignee: Valeo, Creteil (FR)

( * ) Notice: Subject to any disclaimer, the term of this patent is extended or adjusted under 35 U.S.C. 154(b) by 0 days.

(21) Appl. No.: 09/329,595

(22) Filed: Jun. 10, 1999

(30) Foreign Application Priority Data

Jun. 10, 1998 (FR) .................................................. 98 07273

(51) Int. Cl.[7] .......................... B01D 53/04; B01D 46/10; B01D 39/08
(52) U.S. Cl. .............................. 96/135; 96/153; 96/154; 55/385.3; 55/497; 55/516; 55/521; 55/DIG. 5
(58) Field of Search ............................ 55/497, 514, 516, 55/519, 521, DIG. 5, 385.3; 96/135, 137, 142, 149, 153, 154

(56) References Cited

U.S. PATENT DOCUMENTS

| | | | |
|---|---|---|---|
| 2,210,862 | * 8/1940 | Tronstad | 96/154 |
| 3,406,501 | * 10/1968 | Watkins | 96/135 |
| 4,081,501 | 3/1978 | Muther | 264/89 |
| 4,181,513 | * 1/1980 | Fukuda et al. | 96/153 |
| 4,250,172 | * 2/1981 | Mutzenberg et al. | 96/154 X |
| 4,906,263 | * 3/1990 | Von Blücher et al. | 96/135 |
| 5,004,487 | * 4/1991 | Kowalczyk | 55/385.3 X |
| 5,129,929 | * 7/1992 | Linnersten | 55/521 X |
| 5,332,426 | * 7/1994 | Tang et al. | 55/385.3 X |
| 5,350,444 | * 9/1994 | Gould et al. | 55/385.3 X |
| 5,354,365 | * 10/1994 | Youn | 96/135 |
| 5,423,903 | * 6/1995 | Schmitz et al. | 55/385.3 X |
| 5,478,377 | * 12/1995 | Scavnicky et al. | 96/154 X |
| 5,486,410 | * 1/1996 | Groeger et al. | 96/154 X |
| 5,662,728 | * 9/1997 | Groeger | 96/154 X |
| 5,772,738 | * 6/1998 | Muraoka | 96/135 X |
| 5,820,644 | * 10/1998 | Mori et al. | 55/385.3 |
| 5,820,645 | * 10/1998 | Murphy, Jr. | 55/521 X |
| 5,869,009 | * 2/1999 | Bellefeuille et al. | 96/153 X |

FOREIGN PATENT DOCUMENTS

| | | | |
|---|---|---|---|
| 0 348 993 | 1/1990 | (EP) . | |
| 54-162276 | * 12/1979 | (JP) | 96/142 |
| 54-162277 | * 12/1979 | (JP) | 96/142 |
| 55-119418 | * 9/1980 | (JP) | 96/153 |

OTHER PUBLICATIONS

Patent Abstracts of Japan, vol. 96, No. 2, Feb. 29, 1996 & JP 07 265640 A (Tsuchiya Mfg. Co), Oct. 17, 1995.
Patent Abstracts of Japan, vol. 97 No. 5, May 30, 1997 & JP 09 010539 A (Shimizu Corp.), Jan. 14, 1997.

* cited by examiner

*Primary Examiner*—Robert H. Spitzer
(74) *Attorney, Agent, or Firm*—Morgan & Finnegan, LLP

(57) ABSTRACT

A combined filter, for removing solid particles and noxious gases from air to be delivered into the cabin of a vehicle, as part of a ventilating, heating and/or air conditioning system, comprises two layers of a non-woven tissue such as polypropylene, between which are deposited activated carbon granules. The two layers of non-woven tissue are interleaved at least partially, so as to trap the granules between them.

37 Claims, 4 Drawing Sheets

COMBINED FILTER DEVICE FOR FILTERING OUT PARTICLES AND GASES

FIELD OF THE INVENTION

An object of the present invention is to provide a filter device of the combined type, a filter device which filters out, and retain, solid particles as well as gases. Such a filter device is more particularly intended for purification of air which is then used for ventilation and/or heating and/or air conditioning of enclosed spaces, for example the interior of a motor vehicle.

The invention also relates to a method for making such a filter device.

BACKGROUND OF THE INVENTION

Filter devices of the above general kind, as currently known in the prior art, generally comprise an element, a so-called particle filter, which arrests solid particles entrained by the air passing through the filter, together with an element in the form of an odour filter which consists essentially of activated carbon.

The activated carbon is in the form of porous granules which are disposed downstream of the particle filter. The major problem which then arises in such prior art filters is the difficulty of inserting and maintaining the activated carbon granules in the filter device.

It has been proposed to utilize linking particles mixed with the activated carbon granules, so as to fix the latter on the support in which they are placed, in practice the particle filter. However, the efficiency of such an odour filter does not have an optimum value, for two reasons. In the first place the presence of linking particles proportionally reduces the quantity of activated carbon granules. In addition, the linking particles are provided for the purpose of bonding the activated carbon granules on a support; but as a result of this bonding, a major proportion of the pores in the activated carbon granules are obstructed. This reduces the capacity of the activated carbon granules to retain gases and at the same time increases the loss of pressure in the odour filter.

DISCUSSION OF THE INVENTION

An object of the present invention is to overcome the above mentioned drawbacks of the prior art.

According to the invention in a first aspect, a combined filter device for retaining particles and gases, more particularly a filter device for purification of air for the purpose of ventilating and/or heating and/or air conditioning a space, such as the interior of a motor vehicle, is characterised in that it comprises two layers of non-woven tissue between which there are disposed granules of activated carbon, the two layers of non-woven tissue interleaved at least partially so as to trap the activated carbon granules between them.

In this way, the carbon granules are held in place without any need to bond the granules to their support. In addition, the capacity of the filter for retaining noxious gases is considerably improved. Moreover, the loss of pressure caused by the filter device in the flow of air is greatly reduced.

According to a preferred feature of the invention, at least one of the layers of non-woven tissue comprises an isotropic or anisotropic card web comprising fibres of the same nature, or a mixture of different fibres. The web is preferably made as a single layer.

The length of the fibres is preferably at least 5 mm, and no more than 120 mm.

The mean diameter of the fibres is preferably at least 1 $\mu$m.

According to another preferred feature of the invention, the fibres are selected from among the following: the group consisting of thermoplastic fibres, such as fibres of polypropylene, polyethylene, polyimide, polyester, polycarbonate and/or polyamide; the group consisting of acrylic fibres, in particular preoxidised acrylic fibres; the group consisting of aramide fibres; the group consisting of phenolic fibres; the group consisting of fluorocarbon fibres; the group consisting of mineral fibres such as those of glass; and the group consisting of metallic fibres.

In preferred embodiments of the invention, the activated carbon granules have a mean size in the range between 20 and 50 mesh, and a specific surface area (surface area per unit of mass) of 500 to 2000 $m^2$/g.

In preferred embodiments, the quantity of activated carbon in the filter device represents 5 to 90% of the combined mass of the first layer of non-woven tissue, the bed of activated carbon, and the second layer of non-woven tissue.

Preferably, the surface density (mass per unit of surface area) of the combination of the first layer of non-woven tissue with the activated carbon bed and the second layer of non-woven tissue is between 50 and 600 g/$m^2$.

According to the invention in a second aspect, a method of making a combined filter device, adapted to retain solid particles as well as gases, is characterised by the following steps:

(a) a first layer is made from non-woven tissue;

(b) granules of activated carbon are deposited on the first layer of non-woven tissue so as to form a bed of activated carbon;

(c) a second layer of non-woven tissue is deposited on the bed of activated carbon; and (d) the assembly comprising the first layer of non-woven tissue, the bed of activated carbon and the second layer of non-woven tissue is subjected to a mechanical consolidating operation.

The mechanical consolidating operation is preferably a hydraulic binding operation, after which the assembly is preferably subjected to a drying operation.

According to a preferred feature of the invention in its said second aspect, the assembly comprising the first layer of non-woven material, the bed of activated carbon and the second layer of non-woven material, after having been consolidated mechanically and either before or after any subsequent drying operation, undergoes a pleating operation. After step (a) and before step (b), the first layer of non-woven tissue may undergo a mechanical consolidating operation which is preferably performed by means of a hydraulic binder. In that case, in step (b), the activated carbon granules are preferably deposited on the first layer of non-woven material with the latter being damp, which facilitates, and ensures, that the carbon granules are held in place during step (d) of the method.

In some versions of the method according to the invention, at least one of the first and second said layers of non-woven material is obtained by a carding operation performed on fibres having a length in the range between 38 mm and 120 min, and having a diameter greater than 1 $\mu$m, thereby forming an isotropic card web.

Alternatively or in addition, at least one of the first and second said layers of non-woven material is obtained by a carding operation performed on fibres having a length in the range between 5 mm and 120 mm, and a diameter greater than 10 $\mu$m, thereby forming an isotropic or anisotropic card web.

The carding operation is preferably carried out using a wool-type card, which preferably includes stirring devices of the "pell-mell" type.

In versions of the method according to the invention in which the operation of mechanical consolidation is performed by hydraulic binding, and/or in which, between steps (a) and (b), the first layer is subjected to mechanical consolidation by means of hydraulic binding, this hydraulic binding operation comprises passing the web, disposed on a rotating drum, through very fine high pressure water jets. The pressure of these water jets is preferably in the range between 40 and 200 bar.

Further features and advantages of the invention will appear more clearly on a reading of the following detailed description of preferred embodiments of the invention, which is given by way of non-limiting example only and with reference to the accompanying drawings. The description and drawings are directed, in particular, to a practical embodiment of a filter device which is designed to be incorporated in a heating or air conditioning apparatus for a motor vehicle.

DESCRIPTION OF PREFERRED EMBODIMENTS OF THE INVENTION

Figure 1:
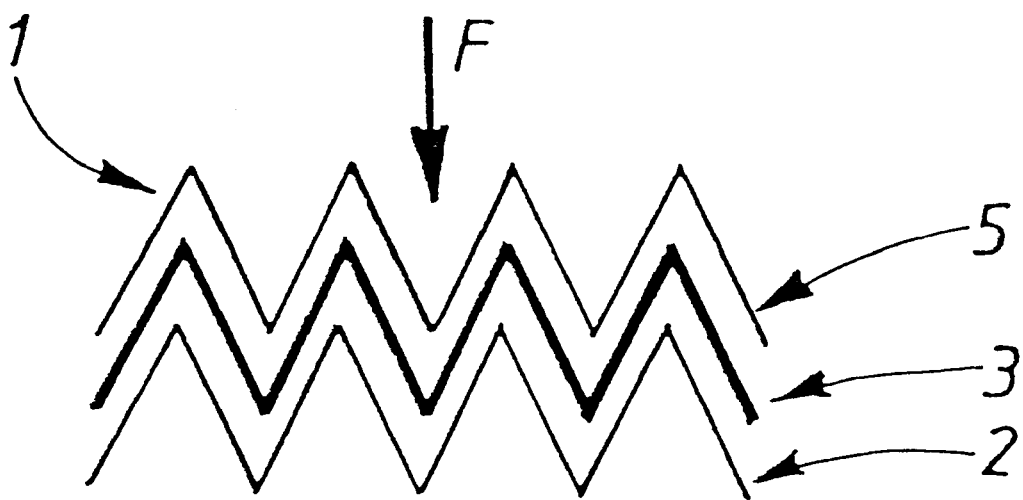
FIG. 1 is a diagrammatic view in cross section showing a small portion of a filter device according to the invention.
Figure 2:
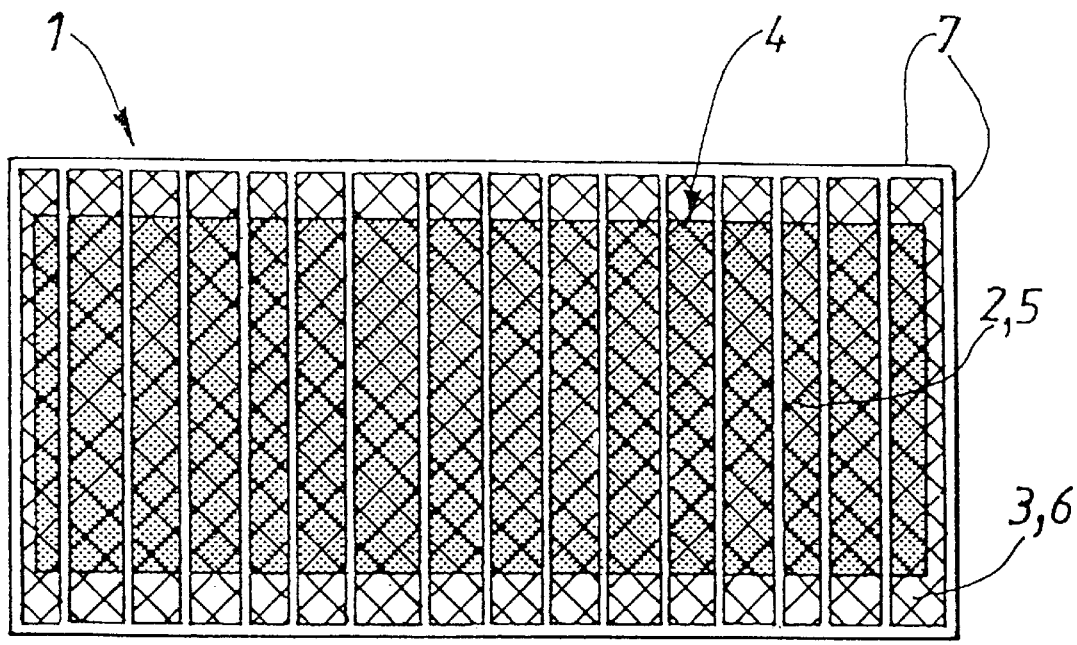
FIG. 2 is a front view of the filter device of FIG. 1.

Reference is first made to FIGS. 1 and 2, in which the filter device comprises a flexible grid 2 of pleated form, against which a filter medium 3 is disposed without being fixed to the grid. The filter medium 3 and the grid 2 together constitute a combined filter in the form of a non-woven mat which comprises a sandwich having activated carbon in its centre. The filter medium 3 is itself pleated in the same way as the grid 2.

This combined filter includes a sub-assembly 3 in the form of two non-woven layers, with activated carbon granules disposed between them. The two non-woven layers are at least partly interleaved in such a way as to trap the activated carbon granules. The non-woven mat, i.e. each of these layers, comprises long fibres, the length of which is preferably at least 5 mm. These long fibres have a mean diameter which is equal to or greater than 1 micron. The fibres are of thermoplastic material and, in practice, are preferably made of polypropylene.

The grid 2 is also polypropylene. It is located downstream, in the direction indicated by the arrow F, of the flow of air in the filter device.

In the example shown in FIG. 1, a second pleated flexible grid 2 is provided, such that the filter medium 3 is located between the two grids 2 and 5, without being fixed to either grid. The second grid 5, which is an inlet grid, is preferably located upstream of the filter medium 3 in the direction F of flow of the air in the filter device.

Preferably the second grid 5 is of the same material as the other grid 2, and is therefore preferably made of polypropylene. However, in another version the two grids 2 and 5 are of different materials.

The filter device in FIGS. 1 and 2 has a symmetrical form of construction, which advantageously enables it to be arranged various ways in an apparatus for heating and/or ventilating and/or air conditioning. This makes it unnecessary to provide, any kind of locating device or indicator as to the fitting direction. The filter device is thus reversible. In this case, of course, the inlet grid is able to act as an outlet grid, and conversely the outlet grid (the grid 2 in the above description) would serve as an inlet grid.

A flexible frame is arranged to support the various components of the filter device. One such flexible frame is shown at 7 in FIG. 2. This frame 7 is made of polypropylene foam, or in another version a polypropylene honeycomb. It is secured to the outlet grid 2 or the inlet grid 5, and is preferably secured to both of the grids 2 and 5 (where both are provided).

Figure 3:
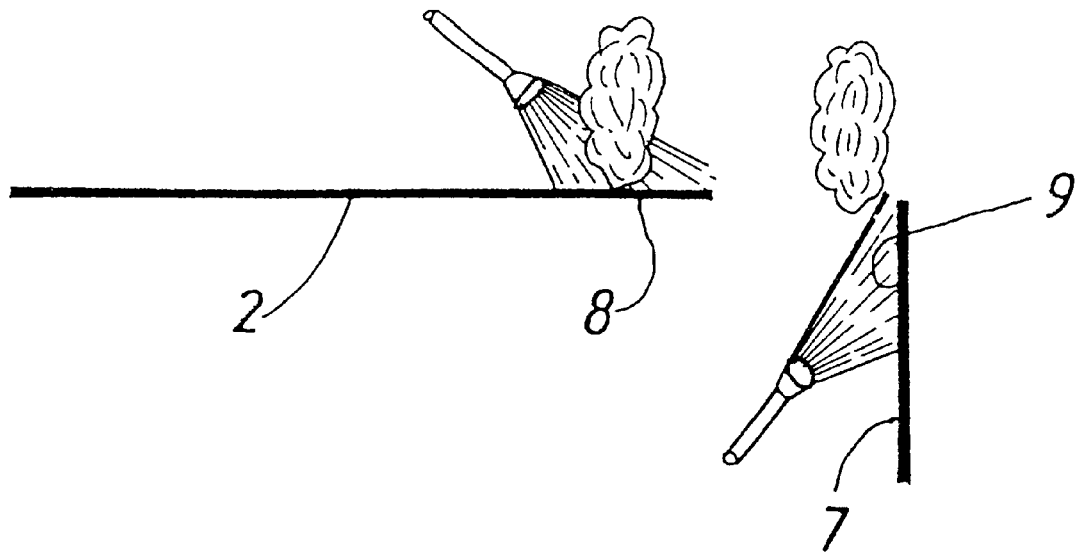
FIGS. 3 and 4 are diagrammatic views which together illustrate the fastening of a grid to the frame of the filter device.
Figure 4:
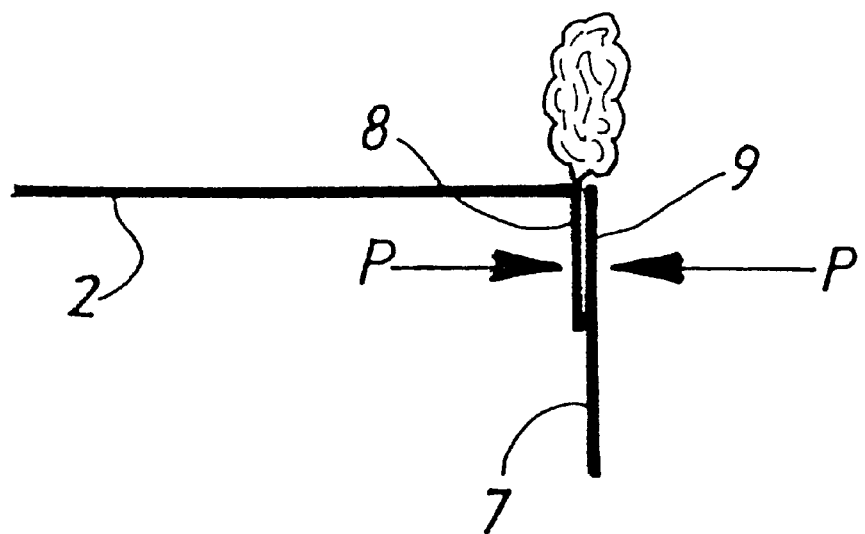

Fastening of a grid 2 or 5 to the flexible frame 7 is preferably carried out in the way indicated diagrammatically in FIGS. 3 and 4, using a so-called mirror welding operation, which comprises simultaneously heating, until they start to melt, a peripheral portion 8 of the grid 2 or 5, and a portion 9 of the frame 7 corresponding to the fastening zone. The peripheral portion 8 and the portion 9 of the frame are then brought together and clamped, so that relative pressure is exerted as indicated diagrammatically by the arrows P in FIG. 4. The mirror welding operation is carried out in such a way that the lateral end 8 of the grid 2 or 5 is caused to bend through a right angle, so that it lies against the corresponding internal face of the frame 7 as indicated in FIG. 4. The advantage of this is that it provides better fastening of the grid and avoids any leakage of air between the grid and the frame.

In this way several peripheral portions 8, and portions 9 corresponding to them (and preferably all four of these) in the grid 2 or 5 and frame 7, are conveniently secured together.

As indicated in FIG. 2, the two grids 2 and 5 are secured to the frame 7 in the way described above. A solid and durable fastening of the grid 2 or 5 to the frame 7 is obtained, in particular where these components are of the same chemical nature, i.e. of the same material such as polypropylene.

During the mirror welding operation, the sub-assembly 3 is laid against the corresponding grid 2 and/or the grid 5. However, in another version, not shown in the drawings, the frame is moulded around the grid 2 or 5, or around both of the grids 2 and 5, and also moulded on the sub-assembly 3.

Preferably, and as indicated at 4 in FIG. 2, the activated carbon-based adsorption means of the filter device has, on at least one side and preferably on all four sides, a surface area which is smaller than that of the grid 2 and/or 5, and preferably also smaller than that of the sub-assembly 3. The adsorption means are therefore spaced away from the frame 7. This has the advantage that the presence of the adsorption means does not interfere with the fastening of the grids to the frame.

Figure 5:
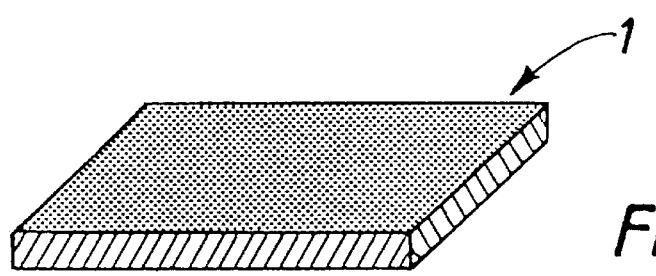
FIGS. 5a and 5b together illustrate the flexibility of the filter.
Figure 5:
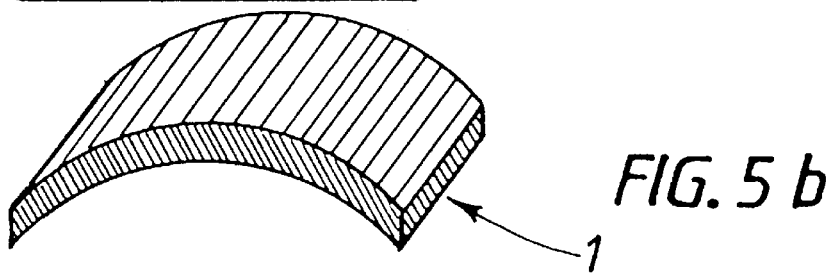

Because of the way the filter is constructed, as described above, the filter has substantial flexibility which enables it to be momentarily curved as shown in FIGS. 5a and 5b, or which even enable it to be twisted, so that the filter can more easily be introduced into a heating and/or ventilating and/or air conditioning apparatus for a motor vehicle, or removed from such an apparatus. This is of particular advantage where, as is very often the case, accessibility to the filter housing is difficult.

Figure 6:
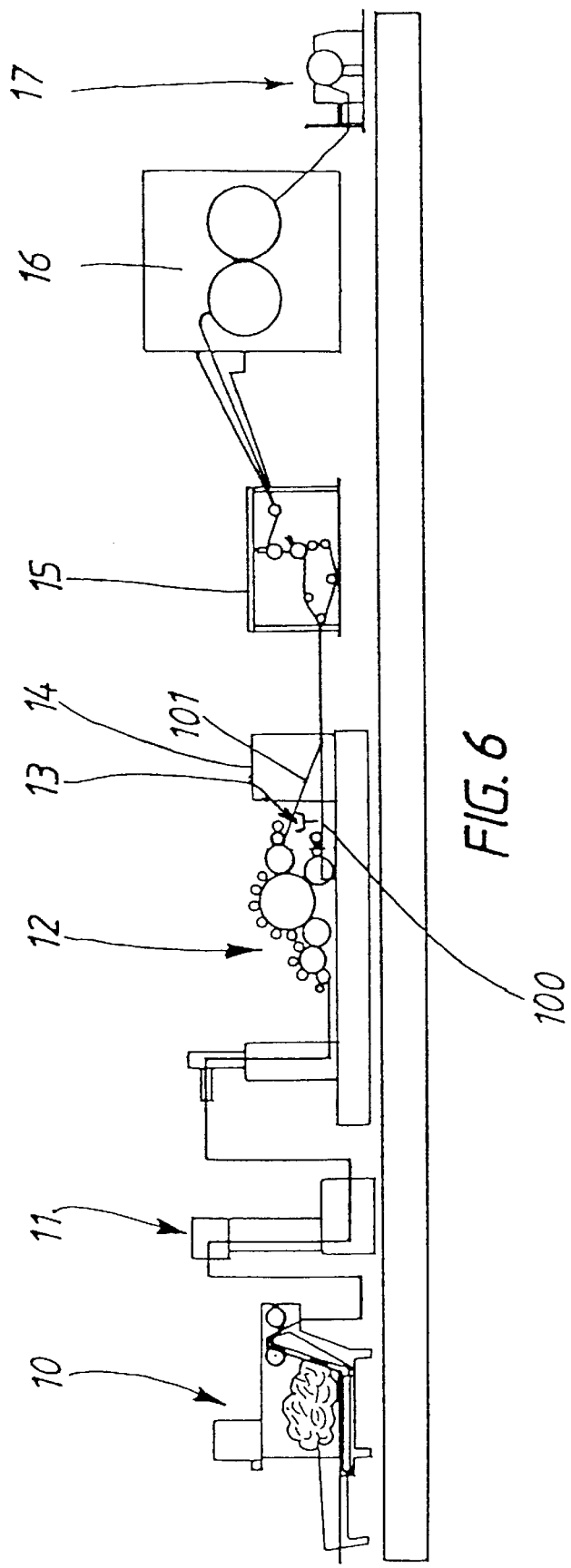
FIG. 6 is a diagrammatic view of one embodiment of a production line for manufacture of the filter device according to the invention.

Reference is now made to FIG. 6, which illustrates a preferred method of making a filter device of the kind described above. In this method, fibres of polypropylene having a linear density of 2.8 dtex, cut to a length of 50 mm, are introduced into a mixer. The mixture of fibres obtained in this mixture is then introduced into a feeder 10 and thence into a storage silo 11, before being carded using a wool-type card 12, having two combs and equipped with a pell-mell type stirrer, in order to obtain two isotropic card webs 100 and 101, each of which constitutes one layer of non-woven tissue.

A layer of activated carbon granules is deposited on one of the webs, 100, by sprinkling using a sprinkler 13. In another version (not shown) the activated carbon is projected on the web 100. The webs 100 and 101 are then introduced into a condenser 14, in which they are superimposed on each other so as to form a cloth, such that the layer of activated carbon granules lies between the two webs.

The parameters of the card and of the condenser are so chosen that two webs are obtained each of which has a superficial density, or surface density, in the range from about 20 to about 80 g/m².

The cloth is laid on a carpet, after which it is consolidated by a hydraulic binding operation in a binding machine 15. This hydraulic binding operation consists in passing the cloth, disposed on a rotating drum, through very fine water jets which are under a high pressure, in the range 40 to 200 bar. By rebounding on the drum, the water jets cause the fibres of one of the webs to become tied to those of the other, thereby giving the cloth a high mechanical strength, but without in so doing increasing its density, while trapping the activated carbon particles within the cloth. The cloth is then passed through a drier 16, after which it is then rolled up on a rolling machine 17. After this the cloth is taken up and subjected to a pleating operation. The cloth is then ready to be fitted on a support so as to constitute the filter device described above. Tests have been carried out on samples having the following characteristics:

Dimensions of the filter sub-assembly:
Length 335 mm
Width 150 mm
Thickness 35 mm;
Each web of unwoven tissue comprising polypropylene fibres of 2.5 dtex gauge;
Total surface density: 420 g/m²;
Percentage of non-woven material: 24%;
Percentage of activated carbon: 76%, corresponding to a mass of 83 g of activated carbon.

The tests carried out on these samples were as follows.
First set of tests

The filter was placed in a stream of air including particles having a mean dimension of 0.5 μm, after having first neutralised any electrostatic charges present by means of a corona discharge, with a flow rate of 450 m³/h until the loss of pressure caused by the retention of the particles reached 450 Pa.

Second set of tests

The filter was placed in a stream of air containing the following noxious gases:
n-butane in a concentration of 80 ppm;
toluene in a concentration of 80 ppm;
sulphur dioxide in a concentration of 30 ppm.

The adsorption value of the noxious gases was measured by integrating the adsorption curve between the start of the test and the point at which efficiency reached the value of 5%.

The results of the various tests were as follows.

| Loss of pressure | Efficiency with 0.5 μm particles | Efficiency for: | | | Adsorption capacity for: | | |
|---|---|---|---|---|---|---|---|
| | | n-butane | toluene | SO₂ | n-butane | toluene | SO₂ |
| 124 Pa | 33% | 78% | 85% | 90% | 2.42 g | 30 g | 2.5 g |

The excellent ability of the filter to retain particles, and the low loss of pressure introduced by the filter, will be noted.

As regards the efficiency figures for the various noxious gases tested, it is known from experience that, in order for a filter device incorporated in an apparatus for ventilating and/or heating and/or air conditioning in a motor vehicle to be effective over a period of time corresponding to a mean accumulated mileage of 30,000 kilometers for the vehicle, the filter must have the following characteristics:

| Efficiency for: | | | Adsorption capacity for: | | |
|---|---|---|---|---|---|
| n-butane | toluene | SO₂ | n-butane | toluene | SO₂ |
| >50% | >65% | >50% | 1.5 g | 20 g | 1.5 g |

The above values are in general obtained with a minimum of 100 g of activated carbon.

Based on the foregoing the filter device according to the invention displays a remarkably improved performance.

What is claimed is:

1. A combined air purification filter for filtering solid particles and noxious gases from a stream of air, comprising
   a grid; and
   a filter medium disposed against without being fixed to the grid, the filter medium comprising
      a first layer of non-woven tissue,
      a second layer of non-woven tissue, and
      activated carbon granules disposed between said layers
         said layers being interleaved to at least partially trap
         the activated carbon granules between said layers.

2. A filter according to claim 1, wherein at least one of said layers of non-woven tissue comprises a carded web.

3. A filter according to claim 2, wherein said web comprises a single layer.

4. A filter according to claim 2, wherein said carded web comprises fibres having a length of at least 5 mm.

5. A filter according to claim 2, wherein said carded web comprises fibres having a length of at most 120 mm.

6. A filter according to claim 2, wherein said carded web comprises fibres having a mean diameter of at least 1 μm.

7. A filter according to claim 2, wherein said carded web comprises fibres selected from among the group consisting of:
   thermoplastic fibres; acrylic fibres; aramide fibres; phenolic fibres; fluorocarbon fibres; mineral fibres; and metallic fibres.

8. A filter according to claim 2, wherein said carded web comprises fibres selected from the group consisting of:
   polypropylene fibres, polyethylene fibres, polyimide fibres, polyester fibres, polycarbonate fibres, polyamide fibres, preoxidised fibres, aramide fibres, phenolic fibres, fluorocarbon fibres, glass fibres, and metallic fibres.

9. A filter according to claim 1, wherein the activated carbon granules have a size in the range between approximately 20 mesh and approximately 50 mesh, and a surface density in the range between approximately 500 g/m$^2$ and approximately 2000 g/m$^2$.

10. A filter according to claim 1, wherein the activated carbon granules are between approximately 5% and approximately 95%, of the mass of an assembly comprising said first layer and second layer and the activated carbon granules.

11. A filter according to claim 1, wherein an assembly comprising said first layer and second layer and the activated carbon granules has a surface density in the range between approximately 50 g/m$^2$ and approximately 600 g/m$^2$.

12. A air conditioning unit including the combined air purification filter of claim 1.

13. A combined filter for filtering particles and gases from an air stream to purify said air stream, said filter comprising
   a grid; and
   an assembly disposed against without being fixed to the grid, the assembly comprising:
      a first layer of non-woven tissue;
      a second layer of non-woven tissue; and
      activated carbon granules, said first layer and said second layer interleaved to at least partially trap said activated carbon granules between said first layer and said second layer.

14. The filter according to claim 13 wherein at least one of said first layer and said second layer comprises a carded web, said carded web formed of fibres.

15. The filter according to claim 14 wherein said fibers have a length of at least 5 mm and at most 120 mm.

16. The filter according to claim 14 wherein said fibres have a mean diameter of at least 1 μm.

17. The filter according to claim 14 wherein said fibres are thermoplastic fibres, acrylic fibres, aramide fibres, phenolic fibres, fluorocarbon fibres, mineral fibres or metallic fibres.

18. The filter according to claim 13 wherein said activated carbon granules range in size between approximately 20 mesh and approximately 50 mesh, and wherein said activated carbon granules have a surface density between approximately 500 g/m$^2$ and approximately 2000 g/m$^2$.

19. The filter according to claim 13 wherein said activated carbon represents between approximately 5% and approximately 95% of the mass of said assembly.

20. The filter according to claim 13 wherein said assembly has a surface density between approximately 50 g/m$^2$ and approximately 600 g/m$^2$.

21. A method of making a combined filter device for retaining solid particles and gases, the method comprising the steps of:
   (a) providing a first layer of non-woven tissue;
   (b) depositing activated carbon granules on said first layer to constitute a bed of activated carbon;
   (c) depositing a second layer of non-woven tissue on said bed, thereby forming an assembly comprising said first layer and said second layer with the activated carbon interposed;
   (d) performing a mechanical consolidating operation on said assembly;
   (e) providing a grid; and
   (f) fitting the filter medium against the grid without fixing the filter medium to the grid.

22. A method according to claim 21, wherein said consolidating operation is performed by a hydraulic binding operation.

23. A method according to claim 22, including the further step of performing a drying operation after said hydraulic binding operation.

24. A method according to claim 22, wherein the step of performing a hydraulic binding operation comprises
   disposing said assembly on a rotating drum and
   directing very fine, high-pressure water jets on said assembly on the rotating drum.

25. A method according to claim 24, wherein the pressure of said water jets is in the range between approximately 40 bar and approximately 200 bar.

26. A method according to claim 21, including the further step of performing a pleating operation on said assembly subsequent to said mechanical consolidating operation.

27. A method according to claim 21, including the further step, between step (a) and step (b), of performing a mechanical consolidating operation, by hydraulic binding, on said first layer of non-woven tissue.

28. A method according to claim 27, including the further step of ensuring that in step (b), said first layer of non-woven tissue is damp, so that the activated carbon granules are deposited on said first layer with said first layer in a damp condition whereby the activated carbon granules are held in position in step (d).

29. A method according to claim 21, further including the step of
   performing a carding operation on fibres having a length in the range between approximately 38 mm and approximately 120 mm and a diameter greater than 1 μm, said carding operation forming an isotropic carded web constituting at least one of said layers of non-woven material.

30. A method of making a combined filter for retaining particles and gases to purify an air stream, said method comprising the steps of:
   providing a grid;
   providing a first layer of non-woven tissue;
   depositing activated carbon granules on said first layer;
   depositing a second layer of non-woven tissue on said activated carbon granules, thereby forming an assembly of said activated carbon granules deposed between said first layer and second layer;
   performing a consolidating operation on said assembly; and
   fitting said assembly against the grid without fixing said assembly to the grid.

31. The method according to claim 30 wherein said consolidating operation is hydraulic binding.

32. The method according to claim 30 wherein said consolidating operation comprises directing water jets on said assembly.

33. The method according to claim 30 further including the step of
   performing a drying operation after said step of performing a consolidating operation.

34. The method according to claim 30 further including the step of
   performing a pleating operation on said assembly subsequent to said step of performing a consolidating operation.

35. The method according to claim 30, further including the step of
   performing a consolidating operation on said first layer between said step of providing a first layer and said step of depositing activated carbon granules.

36. The method according to claim 30 wherein said first layer is damp during said step of performing a consolidating operation.

37. The method according to claim 30, further including the step of performing a carding operation on fibres to form a carded web constituting at least one of said first layer and said second layer.

* * * * *